United States Patent
Yang et al.

(10) Patent No.: US 10,727,535 B2
(45) Date of Patent: Jul. 28, 2020

(54) ELECTROLYTE SYSTEM FOR SILICON-CONTAINING ELECTRODES

(71) Applicant: GM Global Technology Operations LLC, Detroit, MI (US)

(72) Inventors: Li Yang, Troy, MI (US); Mei Cai, Bloomfield Hills, MI (US); Peng Lu, Troy, MI (US); Fang Dai, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 375 days.

(21) Appl. No.: 15/491,089

(22) Filed: Apr. 19, 2017

(65) Prior Publication Data

US 2018/0309169 A1    Oct. 25, 2018

(51) Int. Cl.
| | | |
|---|---|---|
| H01M 10/0569 | (2010.01) | |
| H01M 10/0525 | (2010.01) | |
| H01M 10/0568 | (2010.01) | |
| H01M 4/131 | (2010.01) | |
| H01M 4/48 | (2010.01) | |
| H01M 4/38 | (2006.01) | |

(52) U.S. Cl.
CPC ....... *H01M 10/0569* (2013.01); *H01M 4/386* (2013.01); *H01M 4/483* (2013.01); *H01M 10/0525* (2013.01); *H01M 10/0568* (2013.01); *H01M 2300/004* (2013.01); *H01M 2300/0034* (2013.01); *H01M 2300/0037* (2013.01)

(58) Field of Classification Search
None
See application file for complete search history.

(56) References Cited

U.S. PATENT DOCUMENTS

| | | |
|---|---|---|
| 6,060,184 A | 5/2000 | Gan et al. |
| 7,722,994 B2 | 5/2010 | Halalay |
| 8,394,539 B2 | 3/2013 | Geiculescu et al. |
| 8,586,222 B2 | 11/2013 | Timmons et al. |
| 8,802,301 B2 | 8/2014 | Halalay et al. |
| 9,350,046 B2 | 5/2016 | Huang |

(Continued)

FOREIGN PATENT DOCUMENTS

| | | |
|---|---|---|
| CN | 108899583 A | 11/2018 |
| DE | 102018109166 A1 | 10/2018 |

*Primary Examiner* — Amanda J Barrow
(74) *Attorney, Agent, or Firm* — Harness, Dickey & Pierce, P.L.C.

(57) ABSTRACT

Electrochemical cells that cycle lithium ions are provided. The electrochemical cells have an electrode that includes a silicon-containing electroactive material that undergoes volumetric expansion and contraction during the cycling of the electrochemical cell; and an electrolyte system that promotes passive formation of a flexible protective layer comprising a lithium fluoride-polymer composite on one or more exposed surface regions of the silicon-containing electroactive material. The electrolyte system includes a lithium salt, at least one cyclic carbonate, and two or more linear carbonates. At least one of the two or more linear carbonate-containing co-solvents is a fluorinated carbonate-containing co-solvent. The electrolyte system accommodates the volumetric expansion and contraction of the silicon-containing electroactive material to promote long term cycling stability.

10 Claims, 3 Drawing Sheets

(56) References Cited

U.S. PATENT DOCUMENTS

| | | |
|---|---|---|
| 9,627,716 B2 | 4/2017 | Yang et al. |
| 2008/0131783 A1 | 6/2008 | Choi et al. |
| 2009/0253044 A1* | 10/2009 | Nogi .................. H01M 4/38 |
| | | 429/326 |
| 2009/0253048 A1* | 10/2009 | Shima ................ C07C 69/96 |
| | | 429/338 |
| 2011/0091768 A1 | 4/2011 | Ohashi et al. |
| 2011/0223490 A1 | 9/2011 | Andou et al. |
| 2012/0109503 A1 | 5/2012 | Yang et al. |
| 2012/0121989 A1 | 5/2012 | Roberts et al. |
| 2012/0231325 A1 | 9/2012 | Yoon et al. |
| 2012/0295155 A1 | 11/2012 | Deng et al. |
| 2014/0123477 A1* | 5/2014 | Safont Sempere . H01M 4/0447 |
| | | 29/623.5 |
| 2015/0010811 A1* | 1/2015 | Egorov ............ H01M 10/0567 |
| | | 429/200 |
| 2016/0172711 A1* | 6/2016 | Yang ............... H01M 10/0569 |
| | | 429/332 |
| 2016/0211498 A1 | 7/2016 | Kim et al. |
| 2016/0233513 A1* | 8/2016 | Abe .................... H01M 4/08 |
| 2017/0062827 A1* | 3/2017 | Bruckmeier ........ H01M 4/1395 |
| 2019/0326644 A1* | 10/2019 | Kinoshita ............. H01M 2/10 |

\* cited by examiner

ELECTROLYTE SYSTEM FOR SILICON-CONTAINING ELECTRODES

INTRODUCTION

This section provides background information related to the present disclosure which is not necessarily prior art.

The present disclosure relates to an electrochemical cell having an electrolyte system that improves performance where an electrode incorporates a silicon-containing electroactive material, for example, by promoting passive formation of a flexible protective layer on one or more exposed surface regions of a silicon-containing electroactive material.

High-energy density, electrochemical cells, such as lithium ion batteries can be used in a variety of consumer products and vehicles, such as Hybrid Electric Vehicles (HEVs) and Electric Vehicles (EVs). Typical lithium ion batteries comprise a first electrode (e.g., a cathode), a second electrode (e.g., an anode), an electrolyte material, and a separator. Often a stack of lithium ion battery cells are electrically connected to increase overall output. Conventional lithium ion batteries operate by reversibly passing lithium ions between the negative electrode and the positive electrode. A separator and an electrolyte are disposed between the negative and positive electrodes. The electrolyte is suitable for conducting lithium ions and may be in solid or liquid form. Lithium ions move from a cathode (e.g., positive electrode) to an anode (e.g., negative electrode) during charging of the battery, and in the opposite direction when discharging the battery.

Contact of the anode and cathode materials with the electrolyte can create an electrical potential between the electrodes. When electron current is generated in an external circuit between the electrodes, the potential is sustained by electrochemical reactions within the cells of the battery. Each of the negative and positive electrodes within a stack is connected to a current collector (typically a metal, such as copper for the anode and aluminum for the cathode). During battery usage, the current collectors associated with the two electrodes are connected by an external circuit that allows current generated by electrons to pass between the electrodes to compensate for transport of lithium ions.

Many different materials may be used to create components for a lithium ion battery. By way of non-limiting example, cathode materials for lithium batteries typically comprise an electroactive material which can be intercalated with lithium ions, such as lithium-transition metal oxides or mixed oxides of the spinel type, for example including spinel $LiMn_2O_4$, $LiCoO_2$, $LiNiO_2$, $LiMn_{1.5}Ni_{0.5}O_4$, $LiNi_{(1-x-y)}Co_xM_yO_2$ (where $0<x<1$, $y<1$, and M may be Al, Mn, or the like), or lithium iron phosphates. The electrolyte typically contains one or more lithium salts, which may be dissolved and ionized in a non-aqueous solvent. The negative electrode typically includes a lithium insertion material or an alloy host material. For example, typical electroactive materials for forming an anode include lithium-graphite intercalation compounds, lithium-silicon intercalation compounds, lithium-tin intercalation compounds, lithium alloys.

Certain anode materials have particular advantages. While graphite compounds are most common, recently, anode materials with high specific capacity (in comparison with conventional graphite) are of growing interest. For example, silicon has the highest known theoretical charge capacity for lithium, making it one of the most promising materials for rechargeable lithium ion batteries. However, current anode materials comprising silicon suffer from significant drawbacks. The large volume changes (e.g., volume expansion/contraction) of silicon-containing materials during lithium alloy/dealloy, insertion/extraction (e.g., intercalation and deintercalation) can result in physical damage to the anode, including wrinkling, fracture, or cracking. Such volumetric expansion thus can lead to loss of electrical contact and electrode activity. This is especially true at the loading density levels required for commercial viability of silicon-containing electrodes. Further, a solid electrolyte interface (SEI) layer formation can form on the active material surface and cause continuous electrolyte consumption and lithium ion loss, which can cause irreversible capacity fading in a lithium ion battery. The large volumetric expansion during intercalation/alloy of the anode comprising silicon can thus result in a decline of electrochemical cyclic performance, diminished Coulombic charge capacity (capacity fade), and extremely limited, poor cycle life.

It would be desirable to develop materials for use in high energy lithium ion batteries, which overcome the current shortcomings that prevent widespread commercial use of electrode materials comprising silicon, especially in vehicle applications. For long term and effective use, anode materials containing silicon should be capable of minimal capacity fade and maximized charge capacity for long-term use in lithium ion batteries.

SUMMARY

This section provides a general summary of the disclosure, and is not a comprehensive disclosure of its full scope or all of its features.

In various aspects, the present disclosure provides an exemplary electrochemical cell that cycles lithium ions. The electrochemical cell may include an electrode comprising a electroactive material that under goes volumetric expansion and contraction during the cycling of the electrochemical cell. The electrochemical cell may further include an electrolyte system that promotes passive formation of a flexible protective solid electrolyte interface (SEI) layer comprising a lithium fluoride (LiF)-polymer composite on one or more exposed surface regions of the electroactive material. The electroactive material may be a silicon-containing electroactive material. The electrolyte system may include a lithium salt, one or more cyclic carbonate-containing co-solvents, and two or more linear carbonate-containing co-solvents. At least one of the two or more linear carbonate-containing co-solvents is a fluorinated carbonate-containing co-solvent. The electrolyte system may accommodate the volumetric expansion and contraction of the electroactive material to promote long term cycling stability.

In one variation, the cyclic carbonate-containing co-solvent of the electrolyte system may be present in an amount greater than or equal to about 1% by volume to less than or equal to about 50% by volume.

In one variation, the linear fluorinated carbonate-containing co-solvent of the electrolyte system may be present in an amount greater than or equal to about 2% by volume to less than or equal to about 90% by volume.

In one variation, one of the one or more cyclic carbonate-containing co-solvents of the electrolyte system may be fluoroethylene carbonate (FEC).

In one variation, the linear fluorinated carbonate-containing co-solvent of the electrolyte system may be selected from the group consisting of: methyl 2,2,2-trifluoroethyl carbonate; ethyl 2,2,2-trifluoroethyl carbonate; bis(2,2-difluoroethyl) carbonate; 2,2-difluoroethyl 2,2,2-trifluoroethyl carbonate; 2,2-difluoroethyl hexafluoroisopropyl carbonate;

bis(2,2,2-trifluoroethyl) carbonate; 2,2,3,3,3-pentafluoropropyl 2,2,2-trifluoroethyl carbonate; 2,2-difluoroethyl ethyl carbonate (2F-DEC); 2,2-difluoroethyl methyl carbonate (2F-EMC); and combinations thereof.

In one variation, the linear fluorinated carbonate-containing co-solvent of the electrolyte system may be 2,2-difluoroethyl methyl carbonate (2F-EMC).

In one variation, the electrolyte system may include an additional linear carbonate, so that at least one of the two or more linear carbonate-containing co-solvents is selected from the group consisting of selected from the group consisting of: dimethyl carbonate (DMC), ethyl methyl carbonate (EMC), diethyl carbonate (DEC), and combinations thereof.

In one variation, the electrolyte system may include an additional cyclic carbonate-containing co-solvent selected from the group consisting of: ethylene carbonate (EC), propylene carbonate (PC), and combinations thereof.

In one variation, the electrolyte system includes fluoroethylene carbonate (FEC) at greater than or equal to about 1% by volume to less than or equal to about 50% by volume, 2,2-difluoroethyl methyl carbonate (2F-EMC) at greater than or equal to about 2% by volume to less than or equal to about 90% by volume, and a balance of linear carbonate-containing co-solvents and cyclic carbonate-containing co-solvents cumulatively present at greater than or equal to about 1% by volume to less than or equal to about 98% by volume.

In one variation, at least one of the one or more cyclic carbonate-containing co-solvents of the electrolyte system includes fluoroethylene carbonate (FEC), the linear fluorinated carbonate-containing co-solvent includes 2,2-difluoroethyl methyl carbonate (2F-EMC), and a remaining linear carbonate-containing co-solvent of the two or more linear carbonate-containing co-solvents includes dimethyl carbonate (DMC).

In one further variation, fluoroethylene carbonate (FEC), 2,2-difluoroethyl methyl carbonate (2F-EMC), and dimethyl carbonate (DMC) may be present in a volumetric ratio of about 1:2:2.

In one variation, the lithium salt may include lithium hexafluorophosphate ($LiPF_6$).

In one variation, the electrode may include a silicon-containing electroactive material.

In one variation, the silicon-containing electroactive material of the electrode may undergo volumetric expansion and contraction of greater than or equal to about 300%.

In one variation, the electrode may include $SiO_x$, where $0 \leq x \leq 2$.

In one variation, the flexible SEI protective layer promoted by the electrolyte system may have a thickness greater than or equal to about 1 nm to less than or equal to about 100 nm.

In one variation, the electrolyte system may substantially avoid precipitation at a temperature of less than or equal to about −30° C.

In one variation, the electrolyte system may have an ionic conductivity greater than or equal to about 0.5 mS/cm at about −30° C.

In other aspects, the present disclosure provides another exemplary electrochemical cell that cycles lithium ions. The electrochemical cell may include a positive electrode comprising a positive lithium-based electroactive material, a separator, and a negative electrode comprising a negative silicon-containing electroactive material. The electrochemical cell may further include an electrolyte system that promotes passive formation of a flexible solid electrolyte interface (SEI) protective layer comprising a lithium fluoride (LiF)-polymer composite. The flexible SEI protective layer may form on one or more exposed surface regions of the negative silicon-containing electroactive material. The electrolyte system may include a lithium salt and co-solvents: fluoroethylene carbonate (FEC) and 2,2-difluoroethyl methyl carbonate (2F-EMC).

In one variation, the electrolyte system may include an additional cyclic carbonate-containing co-solvent selected from the group consisting of: ethylene carbonate (EC), propylene carbonate (PC), and combinations thereof.

In one variation, the electrolyte system may include an additional linear carbonate-containing co-solvent selected from the group consisting of: dimethyl carbonate (DMC), ethyl methyl carbonate (EMC), diethyl carbonate (DEC), and combinations thereof.

In one variation, the fluoroethylene carbonate (FEC), 2,2-difluoroethyl methyl carbonate (2F-EMC), and the additional linear carbonate-containing co-solvent may be present in a volumetric ratio of about 1:2:2.

In one variation, the electrode may include $SiO_x$, where $0 \leq x \leq 2$.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
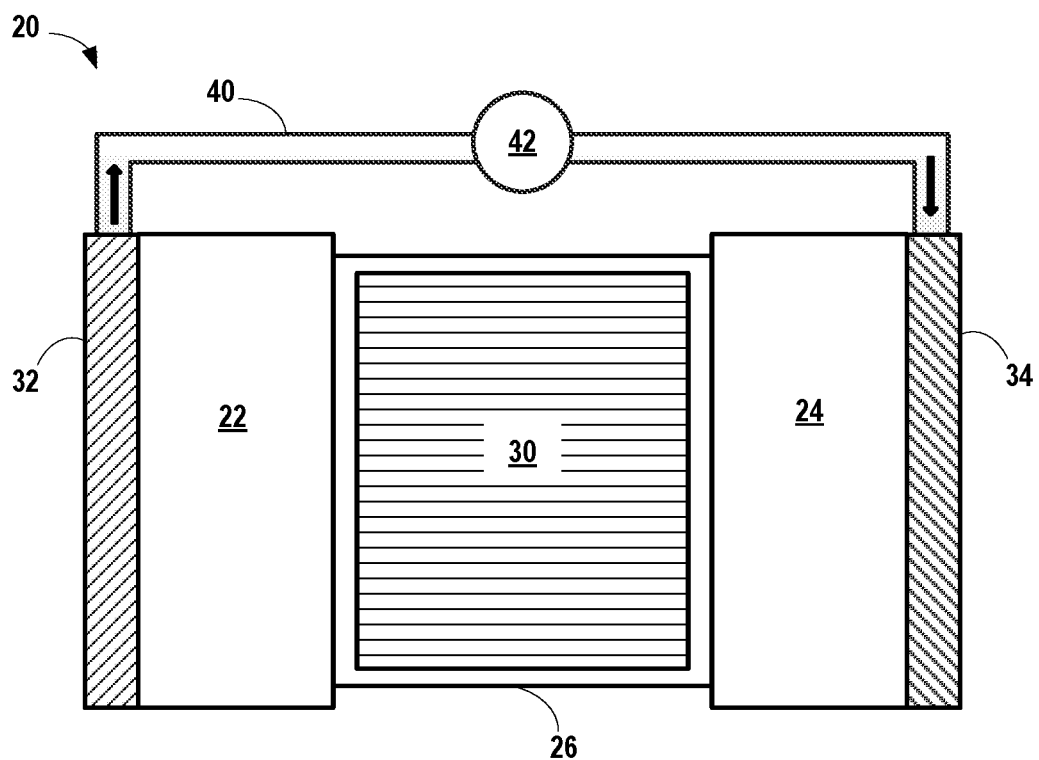
FIG. 1 is a schematic of an exemplary electrochemical battery cell.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

An exemplary illustration of an electrochemical cell that cycles lithium ions (e.g., a lithium-ion battery) 20 is shown in FIG. 1. The lithium-ion battery 20 includes a negative electrode 22, a positive electrode 24, and a separator 26 (e.g., a microporous polymeric separator) disposed between the two electrodes 22, 24. A negative electrode current collector 32 may be positioned at or near the negative electrode 22. A positive electrode current collector 34 may be positioned at or near the positive electrode 24. The negative electrode current collector 32 and positive electrode current collector 34 respectively collect and move free electrons to and from an external circuit 40. An interruptible external circuit 40 and load 42 connects the negative electrode 22 (through its current collector 32) and the positive electrode 24 (through its current collector 34). Each of the negative electrode 22, the positive electrode 24, and the separator 26 may further comprise an electrolyte system 30 capable of conducting lithium ions.

The separator 26 operates as both an electrical insulator and a mechanical support, by being sandwiched between the negative electrode 22 and the positive electrode 24 to prevent physical contact and thus, the occurrence of a short circuit. The separator 26, in addition to providing a physical barrier between the two electrodes 22, 24, may provide a minimal resistance path for internal passage of lithium ions (and related anions) for facilitating functioning of the lithium-ion battery 20.

The lithium-ion battery 20 may generate an electric current during discharge by way of reversible electrochemical reactions that occur when the external circuit 40 is closed (to connect the negative electrode 22 and the positive electrode 24) when the negative electrode 22 contains a relatively greater quantity of intercalated lithium. The chemical potential difference between the positive electrode 24 and the negative electrode 22 drives electrons produced by the oxidation of intercalated lithium at the negative electrode 22 through the external circuit 40 toward the positive electrode 24. Lithium ions, which are also produced at the negative electrode, are concurrently transferred through the electrolyte system 30 and separator 26 towards the positive electrode 24. The electrons flow through the external circuit 40 and the lithium ions migrate across the separator 26 in the electrolyte system 30 to form intercalated lithium at the positive electrode 24. The electric current passing through the external circuit 18 may be harnessed and directed through the load device 42 until the intercalated lithium in the negative electrode 22 is depleted and the capacity of the lithium-ion battery 20 is diminished.

The lithium-ion battery 20 may be charged or re-powered at any time by connecting an external power source to the lithium-ion battery 20 to reverse the electrochemical reactions that occur during battery discharge. The connection of an external power source to the lithium-ion battery 20 compels the otherwise non-spontaneous oxidation of intercalated lithium at the positive electrode 24 to produce electrons and lithium ions. The electrons, which flow back towards the negative electrode 22 through the external circuit 40, and the lithium ions, which are carried by the electrolyte system 30 across the separator 26 back towards the negative electrode 22, reunite at the negative electrode 22 and replenish it with intercalated lithium for consumption during the next battery discharge cycle. The external power source that may be used to charge the lithium-ion battery 20 may vary depending on the size, construction, and particular end-use of the lithium-ion battery 20. Some notable and exemplary external power sources include, but are not limited to, an AC wall outlet and a motor vehicle alternator.

In many lithium-ion battery configurations, each of the negative current collector 32, negative electrode 22, the separator 26, positive electrode 24, and positive current collector 34 are prepared as relatively thin layers (for example, several microns or a millimeter or less in thickness) and assembled in layers connected in electrical parallel arrangement to provide a suitable energy package.

Furthermore, the lithium-ion battery 20 may include a variety of other components (not shown). For instance, the lithium-ion battery 20 may include a casing, gaskets, terminal caps, and any other components or materials that may be situated within the lithium-ion battery 20, including between or around the negative electrode 22, the positive electrode 24, and/or the separator 26, by way of non-limiting example. As noted above, the size and shape of the lithium-ion battery 20 may vary depending on the particular application for which it is designed. Battery-powered vehicles and hand-held consumer electronic devices, for example, are two examples where the lithium-ion battery 20 would most likely be designed to different size, capacity, and power-output specifications. The lithium-ion battery 20 may also be connected in series or parallel with other similar lithium-ion cells or batteries to produce a greater voltage output and power density if it is required by the load device 42.

Accordingly, the lithium-ion battery 20 may generate electric current to a load device 42 that can be operatively connected to the external circuit 40. The load device 42 may be powered fully or partially by the electric current passing through the external circuit 40 when the lithium-ion battery 20 is discharging. While the load device 42 may be any number of known electrically-powered devices, a few specific examples of power-consuming load devices include an electric motor for a hybrid vehicle or an all-electrical vehicle, a laptop computer, a tablet computer, a cellular phone, and cordless power tools or appliances, by way of non-limiting example. The load device 42 may also be a power-generating apparatus that charges the lithium-ion battery 20 for purposes of storing energy.

In various instances, the separator 26 may comprise a microporous polymeric separator comprising a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP. In various instances, the separator 26 may include a ceramic coating that increases the safety of the lithium-ion battery 20. The ceramic coating may comprise alumina ($Al_2O_3$), silicon dioxide ($SiO_2$), or combinations thereof.

When the separator 26 is a microporous polymeric separator, it may be a single layer or a multi-layer laminate, which may be fabricated from either a dry or wet process. For example, in certain instances, a single layer of the polyolefin may form the entire microporous polymer separator 26. In other aspects, the separator 26 may be a fibrous membrane having an abundance of pores extending between the opposing surfaces and may have a thickness of less than a millimeter, for example. As another example, however, multiple discrete layers of similar or dissimilar polyolefins may be assembled to form the microporous polymer separator 26. The microporous polymer separator 26 may also comprise other polymers in addition to the polyolefin such as, but not limited to, polyethylene terephthalate (PET), polyvinylidene fluoride (PVDF), and/or a polyamide. The polyolefin layer, and any other optional polymer layers, may further be included in the microporous polymer separator 26 as a fibrous layer to help provide the microporous polymer separator 26 with appropriate structural and porosity characteristics. Various available polymers and commercial products for forming the separator 26 are contemplated, as well as the many manufacturing methods that may be employed to produce such a microporous polymer separator 26.

In various instances, the positive electrode 24 may be formed from any lithium-based active material that can sufficiently undergo lithium intercalation and deintercalation while functioning as the positive terminal of the lithium-ion battery 20. The positive electrode 24 may include a polymeric binder material to structurally fortify the lithium-based active material.

One exemplary common class of known materials that may be used to form the positive electrode 24 is layered lithium transitional metal oxides. For example, in various instances, the positive electrode 24 may comprise at least one spinel, like lithium manganese oxide ($Li_{(1+x)}Mn_{(2-x)}O_4$, where $0 \leq x \leq 1$) (e.g., $LiMn_2O_4$); lithium manganese nickel oxide ($LiMn_{(2-x)}Ni_xO_4$, where $0 \leq x \leq 1$) (e.g., $LiMn_{1.5}Ni_{0.5}O_4$); lithium cobalt oxide ($LiCoO_2$); lithium manganese oxide ($LiMn_2O_4$); lithium nickel oxide ($LiNiO_2$); a lithium nickel manganese cobalt oxide ($Li(Ni_xMn_yCo_z)O_2$, where $0 \leq x \leq 1$, $0 \leq y \leq 1$, $0 \leq z \leq 1$, and $x+y+z=1$); a lithium nickel cobalt metal oxide ($LiNi_{(1-x-y)}Co_xM_yO_2$, where $0<x<1$, $y<1$, and M may be Al, Mn, or the like); lithium-transition metal oxides or mixed oxides lithium iron phosphates; or a lithium iron polyanion oxide (e.g., lithium iron phosphate (LiFePO$_4$), lithium iron fluorophosphate (Li$_2$FePO$_4$F)).

A variety of other known lithium-based active materials may also be used. By way of non-limiting example, alternative materials may include lithium nickel oxide (LiNiO$_2$), lithium aluminum manganese oxide (Li$_x$Al$_y$Mn$_{(1-y)}$O$_2$), and lithium vanadium oxide (LiV$_2$O$_5$). In certain variations, the positive electrode 24 comprises at least one of spinel, such as lithium manganese oxide (Li$_{(1+x)}$Mn$_{(2-x)}$O$_4$), lithium manganese nickel oxide (LiMn$_{(2-x)}$Ni$_x$O$_4$, where 0≤x≤1), lithium manganese nickel cobalt oxide, (e.g., LiMn$_{1/3}$Ni$_{1/3}$Co$_{1/3}$O$_2$), or lithium iron phosphate (LiFePO$_6$).

The positive electrode 24 may also include electrically conductive materials that facilitate the movement of the electrons within the positive electrode 24. For example, graphite, carbon-based materials, or a conductive polymer may be used. Carbon-based materials may include by way of non-limiting example ketchen black, denka black, acetylene black, carbon black, and the like. Examples of a conductive polymer include polyaniline, polythiophene, polyacetylene, polypyrrole, and the like. In certain aspects, mixtures of conductive materials may be used.

The positive electrode 24 may also include a polymeric binder to form a composite electrode. Thus, the active materials and optional electrically conductive materials may be intermingled with at least one polymeric binder, for example, by slurry casting active materials with such binders, like polyvinylidene fluoride (PVDF), ethylene propylene diene monomer (EPDM) rubber, carboxymethoxyl cellulose (CMC), styrene-butadiene rubber (SBR), or combinations thereof.

The positive current collector 34 may include a compound selected from the group consisting of: gold (Au), lead (Pb), niobium (Nb), palladium (Pd), platinum (Pt), silver (Ag), vanadium (V), tin (Sn), aluminum (Al), copper (Cu), tantalum (Ta), nickel (Ni), iron (Fe), and combinations thereof. The positive current collector 34 may be a continuous layer, such as a foil, or may be grid or mesh, by way of non-limiting example.

In various instances, the negative electrode 22 includes an electroactive material as a lithium host material capable of functioning as a negative terminal of a lithium ion battery. The negative electrode 22 may thus include the electroactive lithium host material and optionally another electrically conductive material, as well as one or more polymeric binder materials to structurally hold the lithium host material together. In various instances, the negative electrode 22 may include a graphite-containing electroactive material.

In various instances, the negative electrode 22 may include an electroactive material that undergoes substantial (e.g., greater than or equal to about 300%) volumetric expansion and contraction during cycling of the electrochemical cell 20. In certain variations, such an electroactive material may include a compound selected from the group consisting of: silicon (Si), tin (Sn), germanium (Ge), bismuth (Bi), zinc (Zn), tellurium (Te), lead (Pb), gallium (Ga), aluminum (Al), arsenic (As), lithium (Li), alloys, oxides, and combinations thereof. As noted, in certain variations, the negative electrode 22 may include an electroactive material that undergoes greater than or equal to about 300% volumetric expansion and contraction during cycling of the electrochemical cell 20. In other variations, the negative electrode 22 may include an electroactive material that undergoes greater than or equal to about 100% volumetric expansion and contraction during cycling of the electrochemical cell 20.

By way of example, in certain instances, the negative electrode 22 may include a silicon-containing electroactive material. Silicon-containing electroactive materials undergo substantial volumetric expansion and contraction during the cycling of the electrochemical cell 20. Exemplary silicon-containing electroactive materials include lithium-silicon and silicon containing binary and ternary alloys, such as Si—Sn; SiSnFe; SiSnAl; SiFeCo; SiO$_x$, where 0≤x≤2; and the like.

The negative electrode 22 may also include electrically conductive materials that facilitate the movement of the electrons within the negative electrode 22. Graphite, carbon-based materials, or a conductive polymer may be used. Carbon-based materials may include by way of non-limiting example ketchen black, denka black, acetylene black, carbon black, and the like. Examples of a conductive polymer include polyaniline, polythiophene, polyacetylene, polypyrrole, and the like. In certain aspects, mixtures of conductive materials may be used.

The electroactive materials comprising the negative electrode 22 may be intermingled with at least one polymeric binder, for example, by slurry casting the electroactive materials with such binders, like polyvinylidene fluoride (PVDF), ethylene propylene diene monomer (EPDM) rubber, carboxymethoxyl cellulose (CMC), styrene-butadiene rubber (SBR), or combinations thereof.

The negative electrode 22 may comprise greater than or equal to about 0% to less than or equal to about 95% by mass of graphite-containing electroactive material. The negative electrode 22 may comprise greater than or equal to about 0% to less than or equal to about 90% by mass of silicon-containing electroactive material. The negative electrode 22 may comprise greater than or equal to about 0% to less than or equal to about 30% by mass of an electrically conductive material and greater than or equal to about 0% to less than or equal to about 30% by mass of binder.

The negative electrode current collector 32 may include a compound selected from the group consisting of: gold (Au), lead (Pb), niobium (Nb), palladium (Pd), platinum (Pt), silver (Ag), vanadium (V), tin (Sn), aluminum (Al), copper (Cu), tantalum (Ta), nickel (Ni), iron (Fe), and combinations thereof. The negative current collector 32 may be a continuous layer, such as a foil, or may be grid or mesh, by way of non-limiting example.

Each of the negative electrode 22, the positive electrode 24, and the separator 26 may include an electrolyte system 30 capable of conducting lithium ions. In particular, the electrolyte system 30 may be capable of conducting lithium ions between the negative electrode 22 and the positive electrode 24. Electrolyte systems 30 may contain at least one lithium salt, as discussed further below. In various aspects, the electrolyte system 30 promotes passive formation of a flexible protective layer (not shown). The flexible protective layer may be a flexible solid electrolyte interface (SEI) protective layer. The protective layer may comprise lithium fluoride (LiF)-polymer composites on one or more exposed surface regions of the electroactive material comprising the negative electrode 22. In certain instances, the lithium fluoride (LiF)-polymer composites may function as a lithium-ion conducting media. In certain instances, the polymer(s) of the lithium fluoride (LiF)-polymer composites may be a polyene polymer(s).

By "flexible," it is meant that the protective layer may accommodate the volumetric expansion and contraction of the electroactive materials (e.g., silicon-containing electroactive materials) in the negative electrode 22 during long-term cycling (e.g., greater than 200 lithiation-delithiation cycles) of the electrochemical cell 20 without damage, fracture, and substantial consumption of the electrolyte. In certain instances, the flexible protective layer disposed on the one or more exposed surface regions of the electroactive material has a thickness greater than or equal to about 1 nm to less than or equal to about 100 nm. In various aspects, the flexible protective layer protects the negative electrode 22 from reaction with the liquid electrolyte during long-term use of the electrochemical cell, as described herein.

As noted above, many lithium-ion batteries can suffer from capacity fade attributable to many factors, including the formation of passive film known as solid electrolyte interface (SEI) layer over the surface of the negative electrode (anode), which is often generated by reaction products of anode materials, electrolyte reduction, and/or lithium ion reduction. Formation of the SEI layer plays a significant role in determining electrode behavior and properties including cycle life and irreversible capacity loss. For example, the large volume changes (e.g., volume expansion/contraction of greater than 300%) of silicon-containing materials during lithium insertion/extraction (e.g., intercalation/alloy and deintercalation/dealloy-intercalation/alloy) may result in the formation of a SEI layer on silicon-containing electroactive materials that can result in continuous electrolyte consumption and lithium ion loss, which can cause irreversible capacity fading in a lithium ion battery during repeat cycling.

The passively formed flexible SEI protective layer facilitated by electrolyte system 30 of the present disclosure minimizes or prevents continuous electrolyte consumption and lithium ion loss and, thereby, minimizes or prevents charge capacity loss in the electrochemical cell and promotes long term cycling stability. The flexible SEI protective layer may comprise a lithium fluoride (LiF)-polymer composite layer that improves cycling performance particularly during volume expansion/contraction of the electroactive material (e.g., silicon). In certain instances, the flexible SEI protective layer may improve robustness at temperatures less than or equal to about −15° C. In certain instances, the flexible SEI protective layer may improve robustness at temperatures less than or equal to about −30° C.

While certain electrolyte systems have demonstrated good cycling performance, they often suffer from narrow operating windows for temperature. Thus, at room temperature the electrolyte system may perform well, but low temperature performance of such an electrolyte formulation is a concern as co-solvents may precipitate from solution. At low temperatures, for example, less than about −15° C., electrolyte conductivity can thus suffer from a sudden drop as one or more solvents precipitate out of solution. However, the electrolyte system 30 provided by certain aspects of the present disclosure provides good cycling performance and electrolyte conductivity, even at low temperatures, while stabilizing the electroactive material by promoting formation of a flexible SEI protective layer that can minimize or avoid undesirable SEI reactions and electrolyte consumption for long-term durability.

The electrolyte system 30 promoting the passive formation of the flexible SEI protective layer comprising lithium fluoride (LiF)-polymer composites includes one or more lithium salts dissolved in one or more solvents. For example only, the lithium salt may be selected from the group consisting of lithium hexafluorophosphate ($LiPF_6$); lithium perchlorate ($LiClO_4$); lithium tetrachloroaluminate ($LiAlCl_4$); lithium iodide (LiI); lithium bromide (LiBr); lithium thiocyanate (LiSCN); lithium tetrafluoroborate ($LiBF_4$); lithium tetraphenylborate ($LiB(C_6H_5)_4$); lithium hexafluoroarsenate ($LiAsF_6$); lithium trifluoromethanesulfonate ($LiCF_3SO_3$); $LiN(FSO_2)_2$ (LIFSI); bis(trifluoromethane)sulfonimide lithium salt ($LiN(CF_3SO_2)_2$); lithium bis(trifluoromethanesulfonyl)imide ($C_2F_6LiNO_4S_2$); $LiB(C_2O_4)_2$(LiBOB); $LiBF_2(C_2O_4)$(LiODFB); $LiPF_4(C_2O_4)$ (LiFOP); $LiNO_3$; and combinations thereof. In certain variations, the lithium salt may be lithium hexafluorophosphate ($LiPF_6$). The one or more lithium salts may be present at greater than or equal to about 10% to less than or equal to about 20% by mass of the electrolyte system 30.

In certain variations, the solvent includes one or more cyclic carbonate-containing co-solvents and two or more linear carbonate-containing co-solvents, where at least one of the two or more linear carbonate-containing co-solvents is a fluorinated carbonate-containing co-solvent. The at least one of the two or more linear carbonate-containing co-solvents is a linear fluorinated carbonate-containing co-solvent comprising fluorine.

The at least one cyclic carbonate-containing co-solvent may be fluoroethylene carbonate (FEC). The linear fluorinated carbonate-containing co-solvent may be an acyclic, linear, organic carbonate-containing compound with fluorine (F) atom(s) attached. For example, the linear fluorinated carbonate-containing co-solvent may be methyl 2,2,2-trifluoroethyl carbonate; ethyl 2,2,2-trifluoroethyl carbonate; bis(2,2-difluoroethyl) carbonate; 2,2-difluoroethyl 2,2,2-trifluoroethyl carbonate; 2,2-difluoroethyl hexafluoroisopropyl carbonate; bis(2,2,2-trifluoroethyl) carbonate; 2,2,3,3,3-pentafluoropropyl 2,2,2-trifluoroethyl carbonate; 2,2-difluoroethyl ethyl carbonate (2F-DEC); 2,2-difluoroethyl methyl carbonate (2F-EMC); or combinations thereof. In certain variations, the linear fluorinated carbonate-containing co-solvent may be 2,2-difluoroethyl ethyl carbonate (2F-DEC), 2,2-difluoroethyl methyl carbonate (2F-EMC), or combinations thereof. In certain instances, fluoroethylene carbonate (FEC) may be present in the electrolyte system 30 in an amount greater than or equal to about 2% by volume to less than or equal to about 50% by volume and the at least one linear fluorinated carbonate-containing co-solvent may be present in an amount greater than or equal to about 0% by volume to less than or equal to about 80% by volume.

Other cyclic and linear carbonate-containing co-solvents may be cumulatively present in the electrolyte system 30 in an amount greater than 0% to less than or equal to about 98%, optionally greater than or equal to about 1% to less than or equal to about 98% by volume. Other exemplary cyclic carbonate-containing co-solvents include ethylene carbonate (EC), propylene carbonate (PC), butylene carbonate, and combinations thereof. Other exemplary linear carbonate-containing co-solvents include dimethyl carbonate (DMC), diethyl carbonate (DEC), ethyl methyl carbonate (EMC)), and combinations thereof.

In one variation, the electrolyte system 30 comprises fluoroethylene carbonate (FEC) at greater than or equal to about 1% by volume to less than or equal to about 50% by volume, 2,2-difluoroethyl methyl carbonate (2F-EMC) at greater than or equal to about 2% by volume to less than or equal to about 90% by volume, and a balance of linear carbonate-containing co-solvents and cyclic carbonate-containing co-solvents cumulatively present at greater than or equal to about 1% by volume to less than or equal to about 98% by volume.

For example only, in certain instances, the electrolyte system 30 may include fluoroethylene carbonate (FEC) as the cyclic carbonate-containing co-solvent; 2,2-difluoroethyl methyl carbonate (2F-EMC) as the linear fluorinated carbonate-containing co-solvent; and dimethyl carbonate (DMC) as a remaining linear carbon-containing co-solvent of the two or more linear carbonate-containing co-solvents. In certain variations, the fluoroethylene carbonate (FEC), dimethyl carbonate (DMC), and 2,2-difluoroethyl methyl carbonate (2F-EMC) may be present in a volumetric ratio of about 1:2:2. For example only, 2,2-difluoroethyl methyl carbonate (2F-EMC) may be present in the electrolyte system 30 in an amount greater than or equal to about 1% by volume to less than or equal to about 90% by volume; dimethyl carbonate (DMC) may be present in the electrolyte system 30 in an amount greater than or equal to about 0% by volume to less than or equal to about 90% by volume; and fluoroethylene carbonate (FEC) may be present in the electrolyte system 30 in an amount greater than or equal to about 1% by volume to less than or equal to about 30% by volume.

In certain instances, the electrolyte system 30 may further include cyclic carbonate-containing co-solvent ethylene carbonate (EC) as one of the one or more cyclic carbonate-containing co-solvents. In such instances, ethylene carbonate (EC) may be present in the electrolyte system 30 in an amount greater than or equal to about 0% by volume to less than or equal to about 50% by volume.

In certain instances, the electrolyte system 30 may further include cyclic carbonate-containing co-solvent propylene carbonate (PC) as one of the one or more cyclic carbonate-containing co-solvents. In such instances, propylene carbonate (PC) may be present in the electrolyte system 30 in an amount greater than or equal to about 0% by volume to less than or equal to about 50% by volume.

In certain instances, the electrolyte system 30 may further include carbonate-containing co-solvents in addition to the at least one cyclic carbonate-containing co-solvent and two or more linear carbonate-containing co-solvents described above. For example, the electrolyte system 30 may further include alkyl carbonates, such as aliphatic carboxylic esters (e.g., methyl formate, methyl acetate, methyl propionate), γ-lactones (e.g., γ-butyrolactone, γ-valerolactone), and mixtures thereof. The additional carbonates-containing co-solvents may present in the electrolyte system 30 in an amount greater than or equal to about 0% by volume to less than or equal to about 50% by volume.

In various aspects, the electrolyte system 30 comprising the lithium salt and solvent comprising one or more cyclic carbonate-containing co-solvents and two or more linear carbonate-containing co-solvents, where at least one of the two or more linear carbonate-containing co-solvents is a linear fluorinated carbonate-containing co-solvent, may substantially avoid precipitation at a temperature of less than or equal to about −30° C. In various aspects, the electrolyte system 30 comprising the lithium salt and solvent comprising one or more cyclic carbonate-containing co-solvent and two or more linear carbonate-containing co-solvents, where at least one of the two or more linear carbonate-containing co-solvents is a linear fluorinated carbonate-containing co-solvent, may have an electrical conductivity greater than or equal to about 0.5 mS/cm at about −30° C. In various aspects, the electrochemical cell cycling lithium ions 20 may have has a capacity loss of less than or equal to about 25% after 500 cycles.

Embodiments of the present technology are further illustrated through the following non-limiting examples.

Example 1

Figure 2:
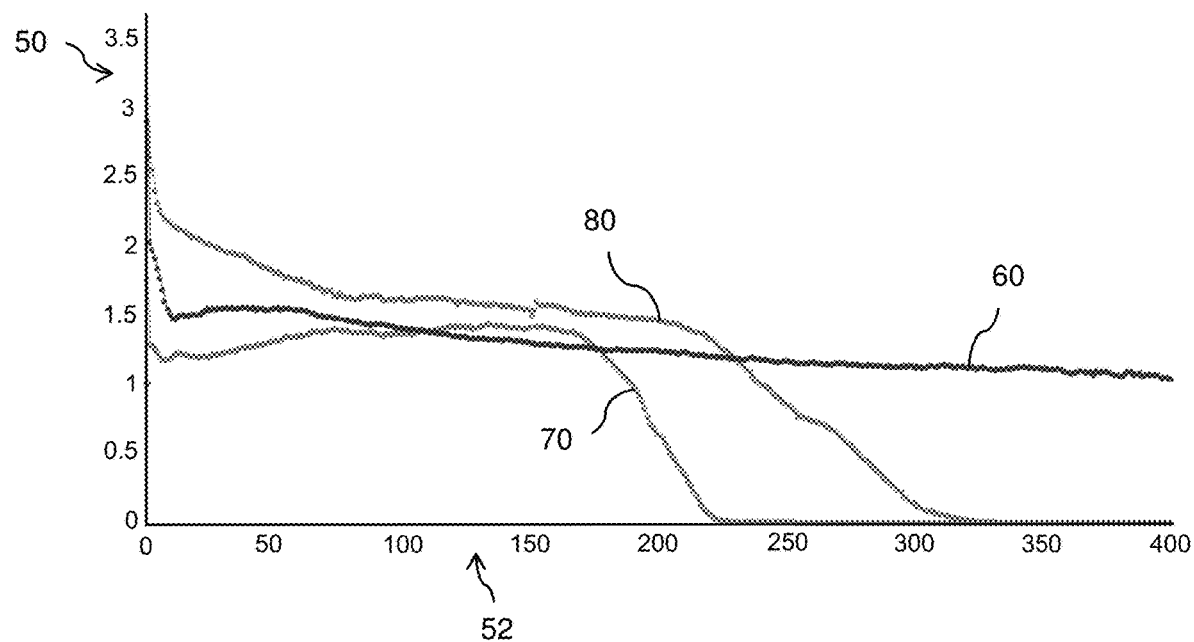
FIG. 2 is a chart showing specific capacities of comparative exemplary electrochemical cells.

FIG. 2 shows the charging and discharging profiles of electrochemical cells of silicon (Si) half cells including comparative electrolyte systems. The y-axis 50 depicts the specific capacity in mAh units, while the cycle number is shown on the x-axis 52.

Electrochemical cell 60 includes an electrolyte system prepared in accordance with certain aspects of the present disclosure. In particular, the electrolyte system of electrochemical cell 60 includes 15% by mass lithium hexafluorophosphate (LiPF$_6$) as the lithium salt and co-solvents fluoroethylene carbonate (FEC), dimethyl carbonate (DMC), and 2,2-difluoroethyl methyl carbonate (2F-EMC) in a volumetric ratio of about 1:2:2.

Electrochemical cell 70 includes an electrolyte system including lithium hexafluorophosphate (LiPF$_6$) and co-solvents fluoroethylene carbonate (FEC), ethyl methyl carbonate (EMC), and dimethyl carbonate (DMC) in a volumetric ratio of about 1:2:2. Electrochemical cell 80 includes an electrolyte system including lithium hexafluorophosphate (LiPF$_6$) and co-solvents dimethyl carbonate (DMC), and fluoroethylene carbonate (FEC) in a volumetric ratio of about 1:4.

As seen, electrochemical cell 80 has improved performance over electrochemical cell 70. After 300 cycles, electrochemical cell 60 has superior performance over electrochemical cells 70 and 80. In particular, electrochemical cell 60 has superior long-term stability with respect to electrochemical cells 70 and 80. Accordingly, electrochemical cell 60 prepared in accordance with certain aspects of the present disclosure shows significant improved cycling performance and reduced capacity fade.

Example 2

Figure 3:
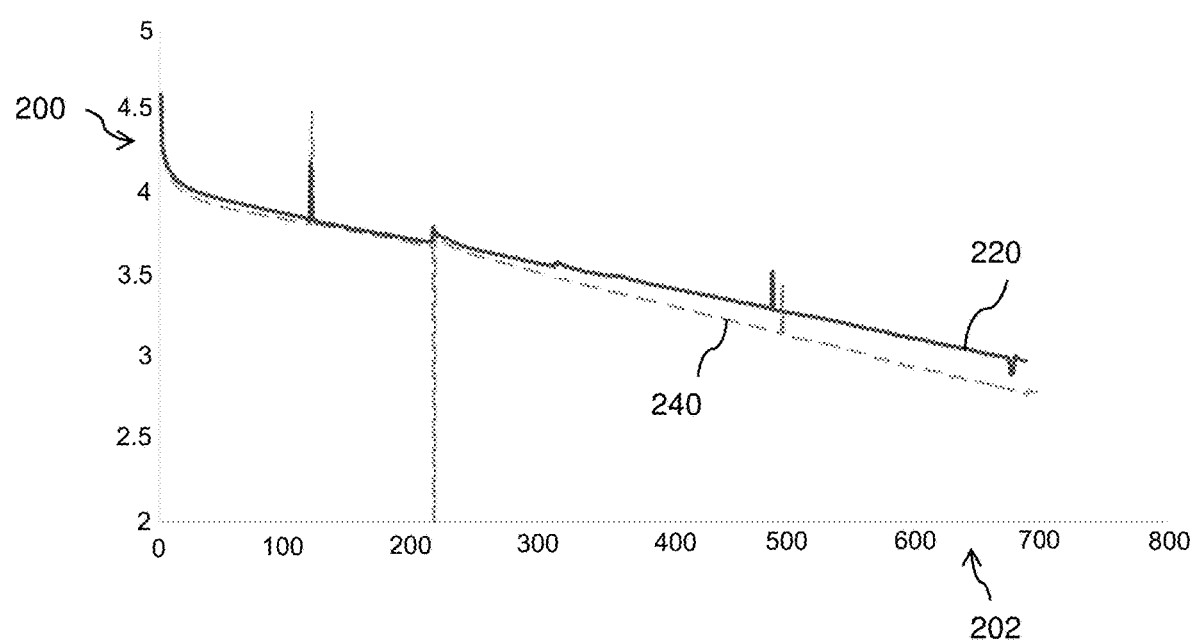
FIG. 3 is a chart showing specific capacities of comparative exemplary electrochemical cells.

FIG. 3 shows the charging and discharging profiles of electrochemical cells based on graphite/SiO$_x$-NMC, including comparative electrolyte systems. The y-axis 200 depicts the capacity in mAh units, while the cycle number is shown on the x-axis 202.

Electrochemical cell 220 includes an electrolyte system prepared in accordance with certain aspects of the present disclosure. In particular, the electrolyte system of electrochemical cell 220 includes lithium hexafluorophosphate (LiPF$_6$) as the lithium salt and co-solvents fluoroethylene carbonate (FEC), dimethyl carbonate (DMC), and 2,2-difluoroethyl methyl carbonate (2F-EMC) in a volumetric ratio of about 1:2:2. The negative electrode of electrochemical cell 220 includes about 70% graphite; about 20% SiO$_x$, where $0.5 \leq x \leq 1.5$; about 2% carboxymethoxyl cellulose (CMC); about 3% styrene-butadiene rubber (SBR); and 5% carbon black.

Electrochemical cell 240 includes an electrolyte system including lithium hexafluorophosphate (LiPF$_6$), about 10% by volume fluoroethylene carbonate (FEC), and co-solvents ethylene carbonate (EC) and ethyl methyl carbonate (EMC) in a volumetric ratio of about 1:2. The negative electrode of electrochemical cell 240 includes 70% graphite; about 20% SiO$_x$, where $0.5 \leq x \leq 1.5$; about 2% carboxymethoxyl cellulose (CMC); about 3% styrene-butadiene rubber (SBR); and 5% carbon black.

As seen electrochemical cell 220 has improved performance over electrochemical cell 240. After 600 cycles, electrochemical cell 220 has superior performance over electrochemical cell 240. In particular, electrochemical cell 220 has superior long-term stability with respect to electrochemical cell 240. Accordingly, electrochemical cell 220 prepared in accordance with certain aspects of the present disclosure shows significant improved cycling performance and reduced capacity fade.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrochemical cell that cycles lithium ions comprising:
   an electrode comprising a silicon-containing electroactive material that undergoes volumetric expansion and contraction during the cycling of the electrochemical cell;
   an electrolyte system comprising:
      greater than or equal to about 10 wt. % to less than or equal to about 20 wt. % of a lithium salt by mass of the electrolyte system, and
      a solvent comprising fluoroethylene carbonate (FEC) and two or more linear carbonate-containing co-solvents,
      wherein at least one of the two or more linear carbonate-containing co-solvents is a linear fluorinated carbonate-containing co-solvent comprising fluorine and selected from the group consisting of: methyl 2,2,2-trifluoroethyl carbonate; ethyl 2,2,2-trifluoroethyl carbonate; bis(2,2-difluoroethyl) carbonate; 2,2-difluoroethyl 2,2,2-trifluoroethyl carbonate; 2,2-difluoroethyl hexafluoroisopropyl carbonate; bis(2,2,2-trifluoroethyl) carbonate; 2,2,3,3,3-pentafluoropropyl 2,2,2-trifluoroethyl carbonate; 2,2-difluoroethyl ethyl carbonate (2F-DEC); 2,2-difluoroethyl methyl carbonate (2F-EMC); and combinations thereof,
      wherein a remaining linear carbonate-containing co-solvent of the two or more linear carbonate-containing co-solvents is selected from the group consisting of dimethyl carbonate (DMC), ethyl methyl carbonate (EMC), diethyl carbonate (DEC), and combinations thereof,
      wherein the fluoroethylene carbonate (FEC) and the two or more linear carbonate-containing co-solvents are present in a volumetric ratio of about 1:2:2, and
      wherein the electrolyte system substantially avoids precipitation of the co-solvents at a temperature less than or equal to about −30° C. and has an electrical conductivity greater than or equal to about 0.5 mS/cm at about −30° C.; and
   a flexible solid electrolyte interface (SEI) protective layer comprising a lithium fluoride (LiF) polymer composite disposed on one or more exposed surface regions of the silicon-containing electroactive material, wherein the flexible solid electrolyte interface (SEI) protective layer has a thickness greater than or equal to about 1 nm to less than or equal to about 100 nm.

2. The electrochemical cell of claim 1, wherein the linear fluorinated carbonate-containing co-solvent of the electrolyte system comprises 2,2-difluoroethyl methyl carbonate (2F-EMC).

3. The electrochemical cell of claim 1, wherein the electrolyte system further comprises an additional cyclic carbonate-containing co-solvent selected from the group consisting of: ethylene carbonate (EC), propylene carbonate (PC), and combinations thereof.

4. The electrochemical cell of claim 1, wherein the linear fluorinated carbonate-containing co-solvent comprises 2,2-difluoroethyl methyl carbonate (2F-EMC) and the remaining linear carbonate-containing co-solvent of the two or more linear carbonate-containing co-solvents comprises dimethyl carbonate (DMC).

5. The electrochemical cell of claim 1, wherein the lithium salt is selected from the group consisting of: lithium hexafluorophosphate ($LiPF_6$), lithium perchlorate ($LiClO_4$); lithium tetrachloroaluminate ($LiAlCl_4$); lithium iodide (LiI); lithium bromide (LiBr); lithium thiocyanate (LiSCN); lithium tetrafluoroborate ($LiBF_4$); lithium tetraphenylborate ($LiB(C_6H_5)_4$); lithium hexafluoroarsenate ($LiAsF_6$); lithium trifluoromethanesulfonate ($LiCF_3SO_3$); $LiN(FSO_2)_2$ (LIFSI); bis(trifluoromethane)sulfonimide lithium salt ($LiN(CF_3SO_2)_2$); lithium bis(trifluoromethanesulfonyl)imide ($C_2F_6LiNO_4S_2$); $LiB(C_2O_4)_2$(LiBOB); $LiBF_2(C_2O_4)$(LiODFB); $LiPF_4(C_2O_4)$ (LiFOP); $LiNO_3$; and combinations thereof.

6. The electrochemical cell of claim 1, wherein the silicon-containing electroactive material comprises $SiO_x$, where $0<x<2$.

7. An electrochemical cell that cycles lithium ions comprising:
   a positive electrode comprising a positive lithium-based electroactive material;
   a separator;
   a negative electrode comprising a negative silicon-containing electroactive material;
   an electrolyte system that comprises:
      greater than or equal to about 10 wt. % to less than or equal to about 20 wt. % of a lithium salt by mass of the electrolyte system,
      co-solvents fluoroethylene carbonate (FEC) and 2,2-difluoroethyl methyl carbonate (2F-EMC),
      an additional linear carbonate-containing co-solvent selected from the group consisting of: dimethyl carbonate (DMC), ethyl methyl carbonate (EMC), diethyl carbonate (DEC), and combinations thereof,
      wherein the fluoroethylene carbonate (FEC), 2,2-difluoroethyl methyl carbonate (2F-EMC), and the additional linear carbonate-containing co-solvent are present in the electrolyte system in a volumetric ratio of about 1:2:2, and
      wherein the electrolyte system substantially avoids precipitation of the co-solvents at a temperature less than or equal to about −30° C. and has an electrical conductivity greater than or equal to about 0.5 mS/cm at about −30° C.; and
   a flexible solid electrolyte interface (SEI) protective layer comprising a lithium fluoride (LiF)-polymer composite disposed on one or more exposed surface regions of the negative silicon-containing electroactive material, wherein the flexible solid electrolyte interface (SEI) protective layer has a thickness greater than or equal to about 1 nm to less than or equal to about 100 nm.

8. The electrochemical cell of claim 7, wherein the electrolyte system further comprises an additional cyclic carbonate-containing co-solvent selected from the group consisting of: ethylene carbonate (EC), propylene carbonate (PC), and combinations thereof.

9. The electrochemical cell of claim 7, wherein the silicon-containing electroactive material comprises $SiO_x$, where $0<x<2$.

10. The electrochemical cell of claim 7, wherein the lithium salt is selected from the group consisting of: lithium hexafluorophosphate ($LiPF_6$), lithium perchlorate ($LiClO_4$);

lithium tetrachloroaluminate (LiAlCl$_4$); lithium iodide (LiI); lithium bromide (LiBr); lithium thiocyanate (LiSCN); lithium tetrafluoroborate (LiBF$_4$); lithium tetraphenylborate (LiB(C$_6$H$_5$)$_4$); lithium hexafluoroarsenate (LiAsF$_6$); lithium trifluoromethanesulfonate (LiCF$_3$SO$_3$); LiN(FSO$_2$)$_2$ (LIFSI); bis(trifluoromethane)sulfonimide lithium salt (LiN(CF$_3$SO$_2$)$_2$); lithium bis(trifluoromethanesulfonyl)imide (C$_2$F$_6$LiNO$_4$S$_2$); LiB(C$_2$O$_4$)$_2$(LiBOB); LiBF$_2$(C$_2$O$_4$)(Li-ODFB); LiPF$_4$(C$_2$O$_4$) (LiFOP); LiNO$_3$; and combinations thereof.

* * * * *